US012196027B2

(12) United States Patent
Lee et al.

(10) Patent No.: US 12,196,027 B2
(45) Date of Patent: Jan. 14, 2025

(54) DOOR OPENING AND CLOSING DEVICE FOR VEHICLE

(71) Applicants: Hyundai Motor Company, Seoul (KR); Kia Corporation, Seoul (KR)

(72) Inventors: Jaeseung Lee, Whasung-Si (KR); Gookhyun Jeon, Whasung-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/379,904

(22) Filed: Oct. 13, 2023

(65) Prior Publication Data

US 2024/0175309 A1 May 30, 2024

(30) Foreign Application Priority Data

Nov. 29, 2022 (KR) ........................ 10-2022-0162697

(51) Int. Cl.
*E05F 15/649* (2015.01)
*E05F 15/662* (2015.01)

(52) U.S. Cl.
CPC .......... *E05F 15/649* (2015.01); *E05F 15/662* (2015.01); *E05Y 2201/624* (2013.01); *E05Y 2201/668* (2013.01); *E05Y 2201/704* (2013.01); *E05Y 2800/242* (2013.01); *E05Y 2900/531* (2013.01)

(58) Field of Classification Search
None
See application file for complete search history.

(56) References Cited

U.S. PATENT DOCUMENTS 6,997,504 B1 * 2/2006 Lang ........................ E05D 3/127 296/146.12
11,446,989 B1 * 9/2022 Brown ................ E05D 15/1005
2022/0297514 A1 * 9/2022 Yamaguchi ................ B60J 5/06
2023/0228142 A1 * 7/2023 Nguyen ................... B60J 5/062 49/70

* cited by examiner

*Primary Examiner* — Marcus Menezes
(74) *Attorney, Agent, or Firm* — Morgan, Lewis & Bockius LLP

(57) ABSTRACT

A door opening and closing device for a vehicle includes a door for opening and closing a door opening formed in a vehicle body, a spindle mounted in a longitudinal direction of the vehicle body and configured to rotate, and a worm wheel gear engaged to the spindle and configured to rotate according to a rotation of the spindle, a first door arm engaged to the worm wheel gear and configured to rotate together with the worm wheel gear, and a second door arm interlocking with the worm wheel gear, selectively moving from or to the first door arm, and configured to slide.

11 Claims, 9 Drawing Sheets

100

DOOR OPENING AND CLOSING DEVICE FOR VEHICLE

CROSS-REFERENCE TO RELATED APPLICATION

The present application claims priority to Korean Patent Application No. 10-2022-0162697 filed on Nov. 29, 2022, the entire contents of which is incorporated herein for all purposes by this reference.

BACKGROUND OF THE PRESENT DISCLOSURE

Field of the Present Disclosure

The present disclosure relates to a door opening and closing device for a vehicle. In particular, the present disclosure relates to, for a vehicle without a B-pillar, a bidirectional door opening and closing device for a vehicle capable of opening and closing a door opening of a vehicle body by rotating the door toward outside of the vehicle body.

Description of Related Art

In general, a vehicle door is a door that separates the interior and exterior of a vehicle, and has an important function of blocking external noise, rain, dust, wind, etc., and absorbing shock with side structures in case of a side collision to safely protect occupants.

There are various types of vehicle doors, including special-purpose doors, but hinge-type swing doors are most often applied to passenger vehicles.

In general, a swing door refers to a door that opens to the outside of the vehicle body around a hinge axis provided through a hinge bracket between the door and the vehicle body, and has the advantage of being easy to open or close, and easy to maintain and repair due to a simple structure.

On the other hand, some vehicles are applied with an opposite swing door which is advantages in that a large sense of openness may be obtained when the door is opened and it is easy for passengers to get on or off. The opposite swing door is opened or closed by use of rotation of an arm connected to the vehicle body and the door.

By the way, although such an opposite swing door includes the advantage of a large door opening and closing amount, there is a problem in that the protruding amount to the outside of the vehicle is excessive due to the length of the arm when the door is opened. As shown in FIGS. 1A, 1B and 1C, a first end of an arm 3 is rotatably fixed to the fixing point A of the vehicle body 1, and when the arm 3 rotates and the door 2 changes from a closed state of FIG. 1A to an open state of FIG. 1B, the movement amount by which the door 2 protrudes outwardly from the body 1 becomes large due to the length of the arm 3, which deteriorates the appearance of the vehicle and causes inconvenience in terms of use.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to maximizing door opening width by changing a length of a door arm connected to the vehicle doors, and at the same time, minimize a protrusion amount of the vehicle door toward the outside of the vehicle body when the door is opened by minimizing a door rotation radius.

A door opening and closing device for a vehicle includes a door for opening and closing a door opening formed in a vehicle body, a spindle mounted in a longitudinal direction of the vehicle body and configured to rotate, and a worm wheel gear engaged to the spindle and configured to rotate according to a rotation of the spindle, a first door arm engaged to the worm wheel gear and configured to rotate together with the worm wheel gear, and a second door arm interlocking with the worm wheel gear, selectively moving from or to the first door arm, and configured to slide.

A door opening and closing device may further include a first pulley coaxially connected to the worm wheel gear, and configured to rotate together with the worm wheel gear, and a second pulley spaced from the first pulley and configured to rotate with the first pulley by interlocking with the first pulley, wherein the first door arm is coaxially connected to the first pulley, and configured to rotate together with the worm wheel gear, and the second door arm is disposed in parallel to the first door arm, engaged to an external circumference of the second pulley, and configured to linearly move according to a rotation of the second pulley.

The first pulley and the second pulley may be connected by a cable, and the cable may be provided to surround the external circumferences of the first pulley and the second pulley, and configured to linearly move according to a rotation of the first pulley to rotate the second pulley.

The first pulley, the second pulley, the first door arm, and the second door arm may be accommodated in a door arm case.

The worm wheel gear, the first pulley, and a second end portion of the first door arm may be coaxially connected to a gear bracket provided in the vehicle body.

The worm wheel gear, the first pulley, and the second end portion of the first door arm may be hinge-rotatably connected to the gear bracket by a bracket pin.

The gear bracket may be provided to surround upper and lower portions of a door arm case.

A first end portion of the second door arm may be rotatably connected to a door bracket provided in the door, and a second end portion of the second door arm may be provided in an interior of a door arm case and configured to linearly move in a longitudinal direction of the door arm case.

The first end portion of the second door arm may be hinge-rotatably connected to the door bracket by a door pin.

The worm wheel gear, the first door arm, and the second door arm may be provided as a pair disposed apart from and in parallel to each other in a longitudinal direction of the spindle.

The spindle may be connected to a center shaft of an actuator provided in the vehicle body, and configured to rotate according to driving of the actuator.

The door may include a front door configured to linearly move and rotate toward a front of the vehicle body and a rear door configured to linearly move and rotate toward a rear of the vehicle body, and the front door and the rear door are provided with the spindle, and the worm wheel gear, the first door arm, and the second door arm respectively.

According to an exemplary embodiment of the present disclosure, by employing a structure in which a door is opened or closed as a length of a door arm connected to a door is changed while the door rotates, a door opening width may be maximized while minimizing a door rotation radius, minimizing protrusion amount of the door toward the outside of the vehicle body when the door is opened.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1A:
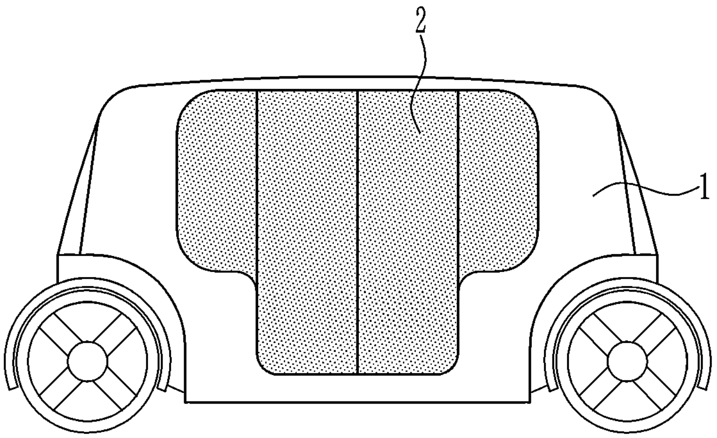
FIG. 1A, FIG. 1B and FIG. 1C schematically illustrate operations of a bidirectional swing door of a conventional vehicle.
Figure 1B:
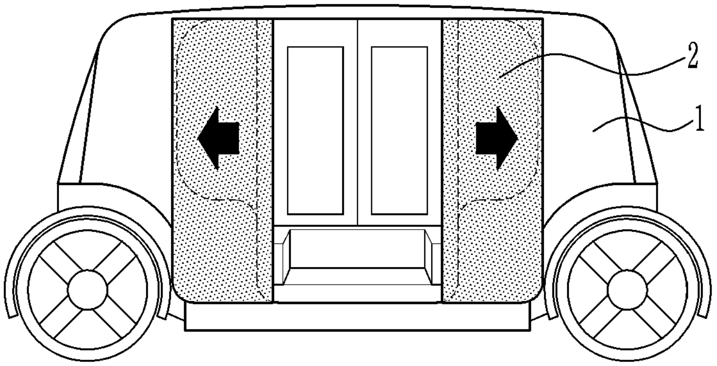
Figure 1C:
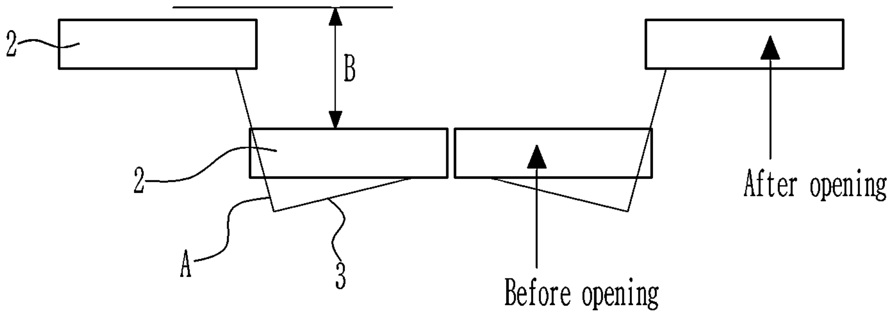

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

Furthermore, with embodiments of the present disclosure, detailed description is made of as to the constituent elements in various exemplary embodiments with reference to the relevant drawings by use of the same reference numerals for the same constituent elements, while only the constituent elements different from those related to the various exemplary embodiments are described in other exemplary embodiments of the present disclosure.

The drawings are schematic, and are not illustrated in accordance with a scale. Relative dimensions and ratios of portions in the drawings are illustrated to be exaggerated or reduced in size for clarity and convenience, and the dimensions are just examples and are not limiting. Furthermore, like structures, elements, or components illustrated in two or more drawings use same reference numerals for showing similar features. It will be understood that when an element such as a layer, film, region, or substrate is referred to as being "on" another element, it may be directly on the other element or intervening elements may also be present.

The exemplary embodiment of the present disclosure shows various exemplary embodiments of the present disclosure in detail. As a result, various modifications of the drawings will be expected. Therefore, the exemplary embodiments are not limited to a specific shape of an illustrated region, but, for example, include a change in the shape in accordance with manufacturing.

Hereinafter, a door opening and closing device for a vehicle according to an exemplary embodiment of the present disclosure is described in detail with reference to the drawings.

Figure 2:
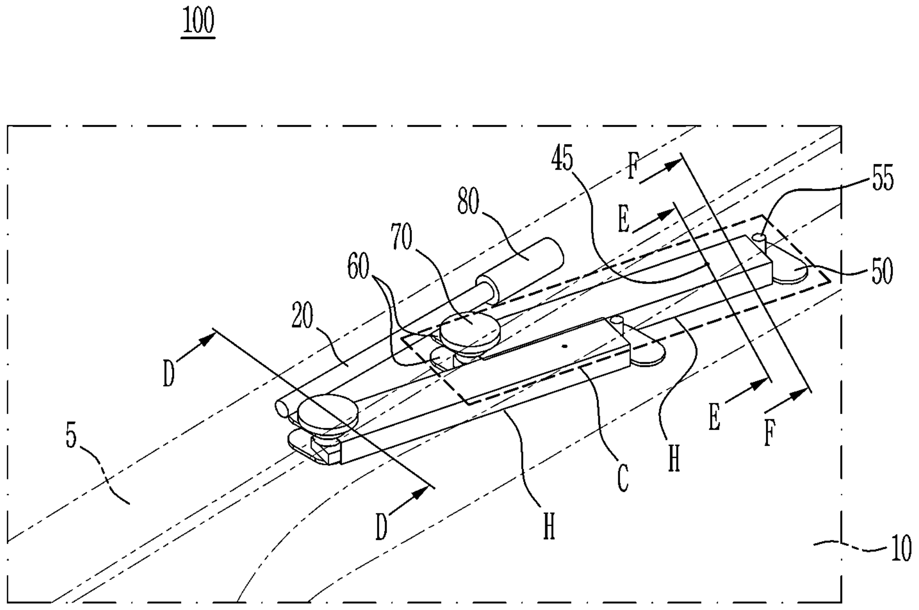
FIG. 2 schematically illustrates a door closed state of a door opening and closing device for a vehicle according to an exemplary embodiment of the present disclosure.
Figure 3:
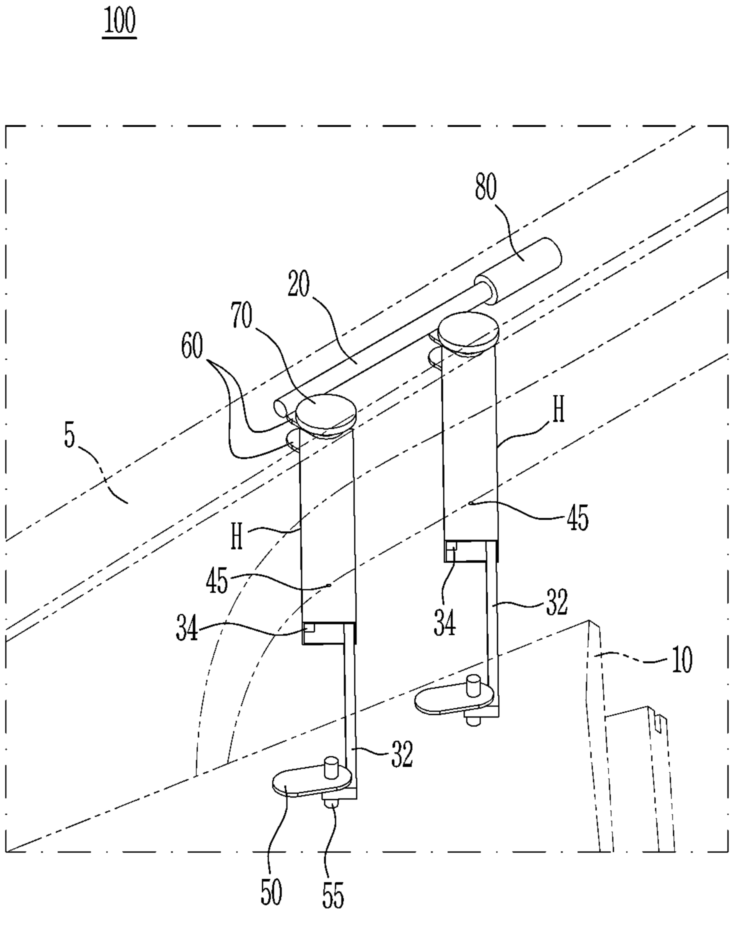
FIG. 3 schematically illustrates a door opened state of a door opening and closing device for a vehicle according to an exemplary embodiment of the present disclosure.
Figure 4:
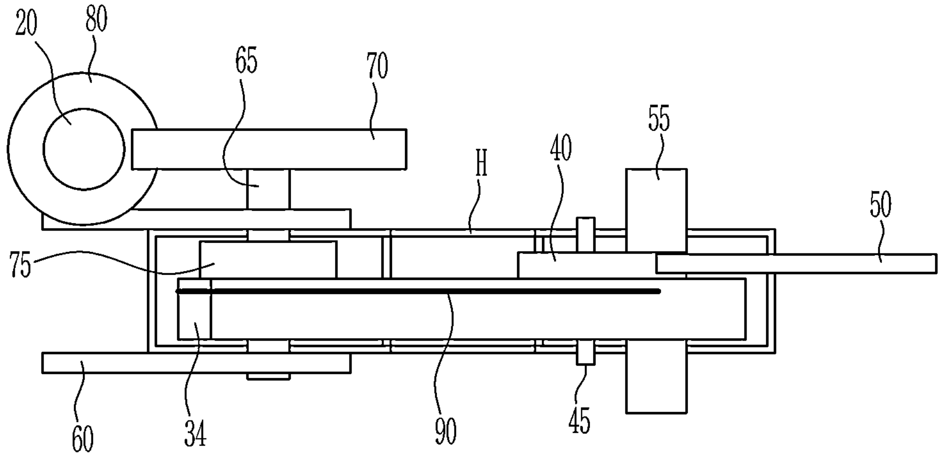
FIG. 4 is an enlarged view of a portion C in FIG. 2.
Figure 5:
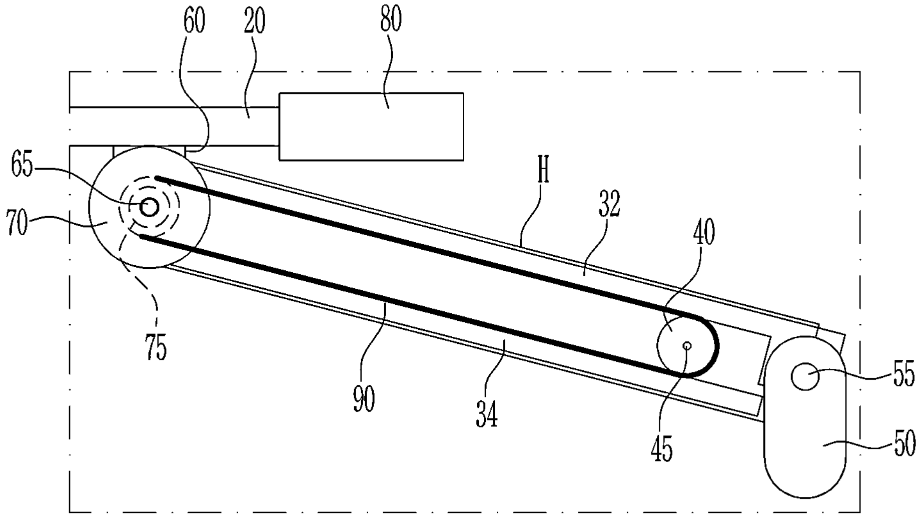
FIG. 5 is a top plan view showing a portion C of FIG. 2 in a door closed state.
Figure 6:
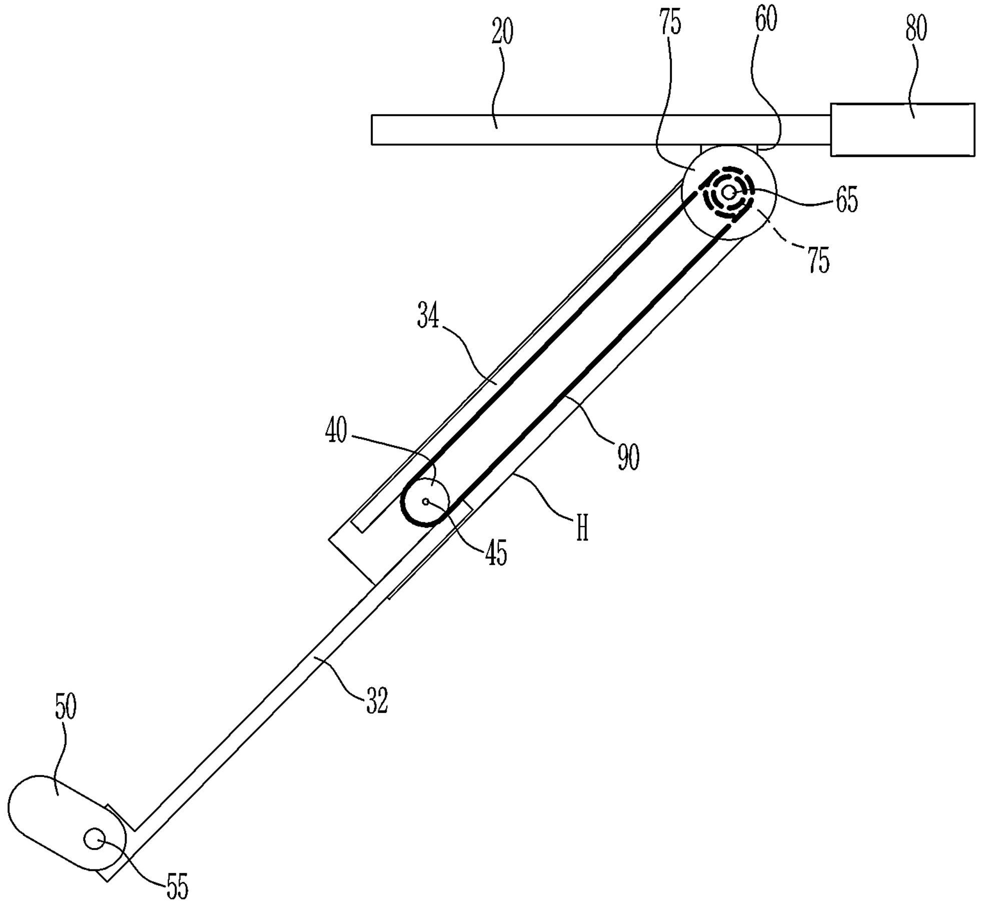
FIG. 6 is a top plan view showing a portion C of FIG. 2 in a door opened state.

FIG. 2 schematically illustrates a door closed state of a door opening and closing device for a vehicle according to an exemplary embodiment of the present disclosure. FIG. 3 schematically illustrates a door opened state of a door opening and closing device for a vehicle according to an exemplary embodiment of the present disclosure. FIG. 4 is an enlarged view of a portion C in FIG. 2. FIG. 5 is a top plan view showing a portion C of FIG. 2 in a door closed state. FIG. 6 is a top plan view showing a portion C of FIG. 2 in a door opened state.

In referring to FIG. 2 and FIG. 6, a door opening and closing device 100 for a vehicle according to an exemplary embodiment includes a door 10, a spindle 20, a worm wheel gear 70, a first door arm 34, and a second door arm 32.

The door 10 is configured to open or close a door opening formed in a vehicle body 5 of the vehicle, and the door arm assembly is connected to the door 10 and the vehicle body 5.

The spindle 20 may be formed in a longitudinal direction of the vehicle body 5 and configured to rotate, and may be rotated in a direction perpendicular to the longitudinal direction of the vehicle body 5. An end portion of the spindle 20 is connected to a center shaft of an actuator 80 such as a motor provided in the vehicle body 5, and may be rotated according to driving of the actuator 80. Adjustment of rotation speed and rotation amount of the spindle 20 may be achieved by adjusting the rotation speed and rotation amount of the actuator 80.

A gear bracket 60 is provided in the vehicle body 5, and the worm wheel gear 70 is hinge-rotatably connected to a bracket pin 65 by the gear bracket 60. The worm wheel gear 70 may be in contact with the spindle 20 to rotate according to a rotation of the spindle 20.

A first pulley 75 may be coaxially connected to the worm wheel gear 70 through the bracket pin 65, and configured to rotate together with the worm wheel gear 70. Furthermore, a second pulley 40 may be provided at a position spaced from the first pulley 75 and configured to rotate together by interlocking with the first pulley 75. That is, the first pulley 75 and the second pulley 40 may be located between the first door arm 34 and the second door arm 32, to be spaced from each other by in the longitudinal direction.

The first pulley 75 and the second pulley 40 may be connected by a cable 90, and the cable 90 may be provided to surround external circumferences of the first pulley 75 and the second pulley 40. When the first pulley 75 rotates according to a rotation of the worm wheel gear 70, the cable 90 may linearly move to rotate the second pulley 40.

The first door arm 34 may be coaxially connected to the first pulley 75 through the bracket pin 65, and configured to rotate together with the worm wheel gear 70. Furthermore, the second door arm 32 may be disposed in parallel to the first door arm 34, and provided in contact with the external circumference of the second pulley 40, and configured to linearly move according to a rotation of the second pulley 40. That is, when the worm wheel gear 70, the first pulley 75, and the first door arm 34 rotate as the spindle 20 rotates, the second pulley 40 rotates by the cable 90, and the second door arm 32 in contact with the external circumference of the second pulley 40 linearly moves. To the present end, a contact portion with the second door arm 32 and the external circumference of the second pulley 40 may be gear-engaged together in a mechanism of screw gears.

The worm wheel gear 70, the first pulley 75, and a second end portion of the first door arm 34 is coaxially connected to the gear bracket 60 provided in the vehicle body 5, and hinge-rotatable about the bracket pin 65. Furthermore, a first end portion of the second door arm 32 is rotatably connected to a door bracket 50 provided in the door 10. When the second pulley 40 rotates, the second door arm 32 linearly moves in parallel to the longitudinal direction of the first door arm 34, to push the door 10 toward the outside of the vehicle body 5.

As shown in FIG. 4, the first pulley 75, the second pulley 40, the first door arm 34, and the second door arm 32 may be accommodated in a door arm case H. Furthermore, the gear bracket 60 may be provided to surround upper and lower portions of the door arm case H. An end portion of the door arm case H on a side of the second pulley 40 is provided in an open form, and the first end portion of the second door arm 32 may reciprocally move in the longitudinal direction of the door arm case H through an open portion of the door arm case H.

In the door closed state, as shown in FIG. 5, the second door arm 32 is fully accommodated in an interior of the door arm case H, and disposed to face the first door arm 34 in a parallel state.

When the spindle 20 rotates as the actuator 80 is driven, the worm wheel gear 70 in contact with the spindle 20 rotates, and the first door arm 34 and the first pulley 75 coaxially connected to a lower portion of the worm wheel gear 70 through the bracket pin 65 rotates. Furthermore, by a rotation of the first pulley 75, the second pulley 40 connected by the cable 90 rotates, and the second door arm 32 in contact with a surface of the second pulley 40 linearly moves.

As shown in FIG. 6, the second door arm 32 linearly moves so that a first end portion may protrudes out of the door arm case H. As a result, the door 10 protrudes outwardly from the vehicle body 5.

Figure 7A:
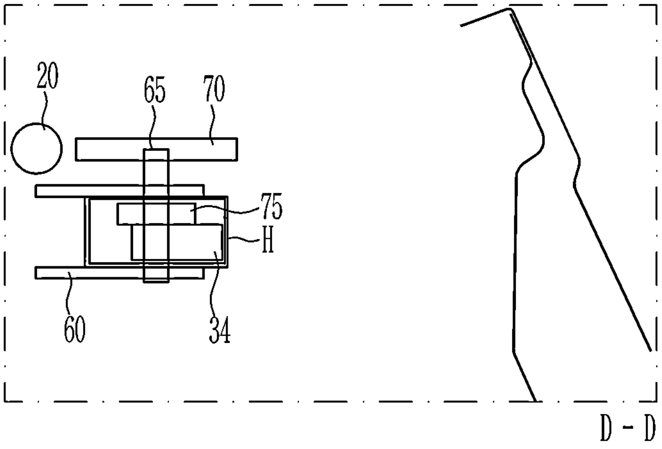
FIG. 7A, FIG. 7B and FIG. 7C are cross-sectional views according to lines D-D, E-E, and F-F of FIG. 2.
Figure 7B:
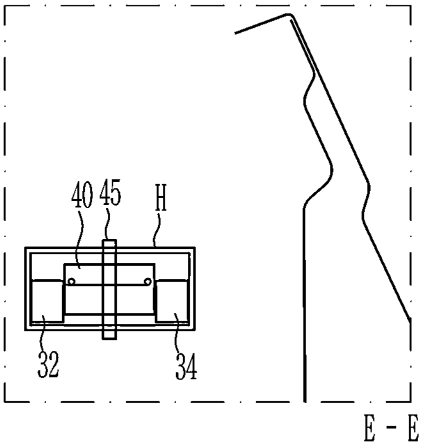
Figure 7C:
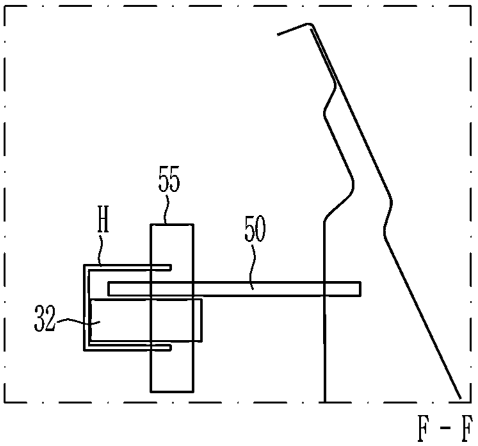

FIG. 7A, FIG. 7B and FIG. 7C are cross-sectional views according to lines D-D, E-E, and F-F of FIG. 2.

As shown in FIG. 7A, the gear bracket 60 provided in the vehicle body 5 is disposed to surround the upper and lower portions of the door arm case H, and the first pulley 75 and the first door arm 34 are accommodated in the interior of the door arm case H. The worm wheel gear 70, the first pulley 75, and the first door arm 34 are coaxially connected to the bracket pin 65, and hinge-rotated together when the spindle 20 rotates.

As shown in FIG. 7B, the first door arm 34, the second door arm 32, and the second pulley 40 are accommodated in the interior of the door arm case H, and the second pulley 40 is disposed between the first door arm 34 and the second door arm 32. The second pulley 40 is disposed to be rotatable about a pulley pin 45 rotatably connected to upper and lower internal surfaces of the door arm case H.

As shown in FIG. 7C, the end portion of the door arm case H is in an open form, and the first end portion of the second door arm 32 is hinge-rotatably connected to the door bracket 50 by a door pin 55. The first end portion of the second door arm 32 and the door bracket 50 may pass through the open end portion of the door arm case H.

Figure 8:
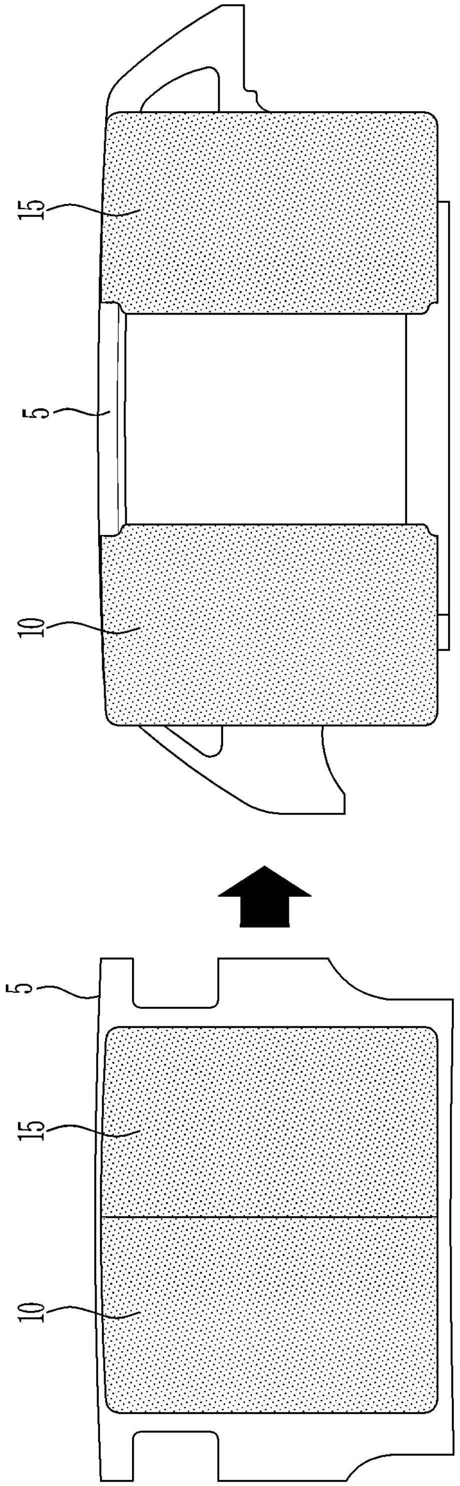
FIG. 8 illustrates closed and opened states of a bidirectional swing door of a vehicle applied with a door opening and closing device for a vehicle according to an exemplary embodiment of the present disclosure, when viewed in front of the vehicle.
Figure 9:
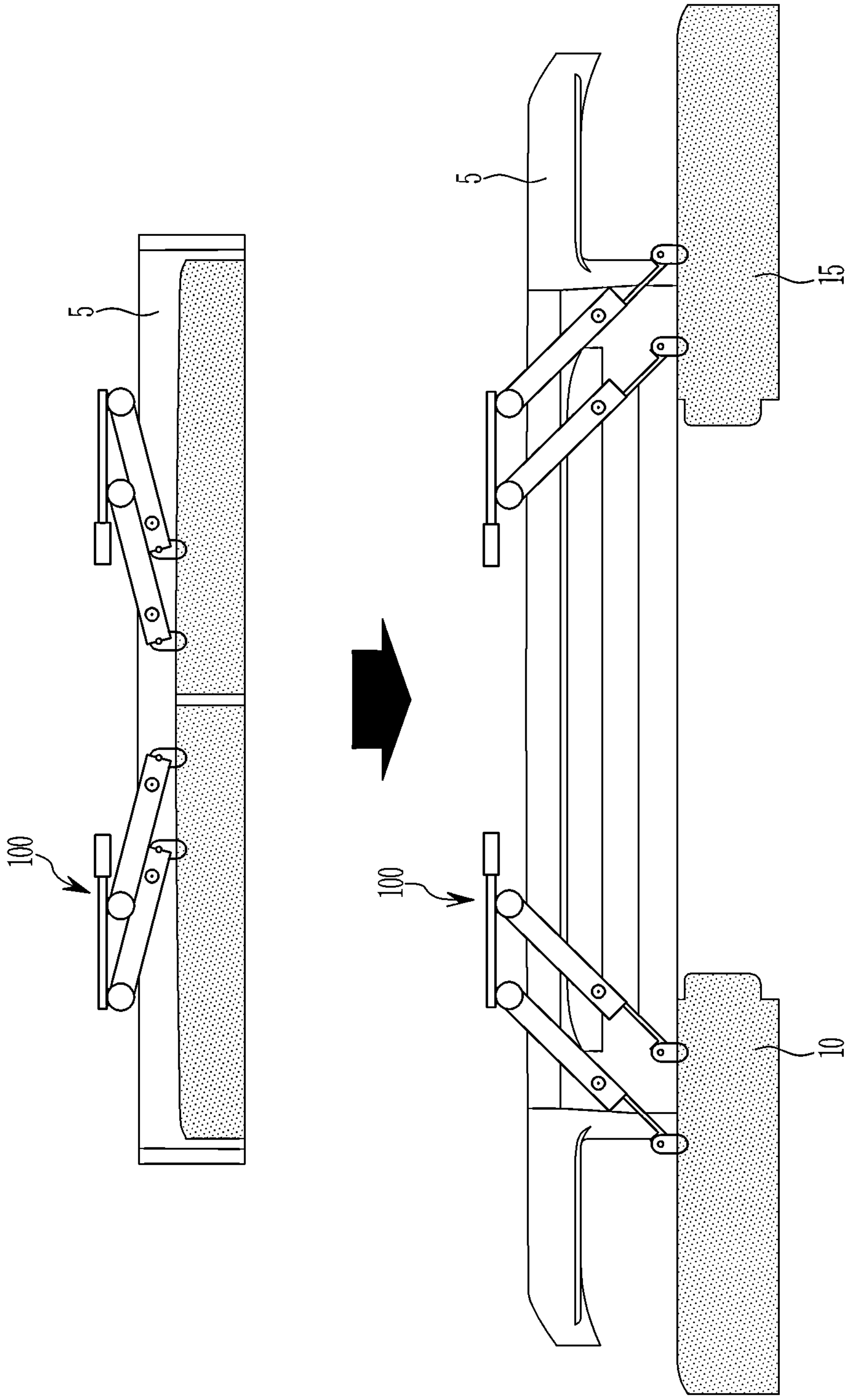
FIG. 9 illustrates closed and opened states of a bidirectional swing door of a vehicle applied with a door opening and closing device for a vehicle according to an exemplary embodiment of the present disclosure, when viewed from above of the vehicle.

FIG. 8 illustrates closed and opened states of a bidirectional swing door of a vehicle applied with a door opening and closing device for a vehicle according to an exemplary embodiment of the present disclosure, when viewed in front of the vehicle. FIG. 9 illustrates closed and opened states of a bidirectional swing door of a vehicle applied with a door opening and closing device for a vehicle according to an exemplary embodiment of the present disclosure, when viewed from above of the vehicle.

As shown in FIG. 8 and FIG. 9, the door opening and closing device for a vehicle according to an exemplary embodiment 100 may be provided to each of a front door 10 and a rear door 15 provided in the front and the rear of the vehicle along the vehicle the longitudinal direction, and alternatively, may be provided to only one of the front door 10 and the rear door 15. Furthermore, it may be applied to an upper side or a lower side of the door 10, and may be widely applied to a structure of opening and closing the door 10 by sliding movement along the vehicle the longitudinal direction as well as in the vehicle width direction.

As described above, for changing the closed state of the door 10 to the opened state, when the spindle 20 rotates by driving the actuator 80, the worm wheel gear 70 rotates to turn the first door arm 34 and the second door arm 32. At the instant time, the first pulley 75 rotated with the first door arm 34 and the worm wheel gear 70 rotates the second pulley 40 connected to the cable 90, and the second door arm 32 passes through the open portion of the door arm case H by the rotation of the second pulley 40 and linearly moves to push the door 10 to protrude toward the outside of the vehicle body 5. Therefore, the door 10 rotates to open the door opening. For changing the closed state of the door 10 to the opened state, the driveshaft of the actuator 80 may be operated in the opposite direction.

Accordingly, by employing a structure in which a door is opened or closed as a length of a door arm connected to a door is changed while the door rotates, a door opening width may be maximized while minimizing a door rotation radius, minimizing protrusion amount of the door toward the outside of the vehicle body when the door is opened.

For convenience in explanation and accurate definition in the appended claims, the terms “upper”, “lower”, “inner”, "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

Furthermore, the term of "fixedly connected" signifies that fixedly connected members always rotate at the same speed. Furthermore, the term of "selectively connectable" signifies "selectively connectable members rotate separately when the selectively connectable members are not engaged to each other, rotate at the same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door opening and closing apparatus for a vehicle, the apparatus comprising:

a door for opening and closing a door opening formed in a vehicle body;

a spindle mounted in a longitudinal direction of the vehicle body and configured to rotate; and a worm wheel gear engaged to the spindle and configured to rotate according to a rotation of the spindle;

a first door arm engaged to the worm wheel gear and configured to rotate together with the worm wheel gear;

a second door arm in conjunction with the worm wheel gear, selectively moving from or to the first door arm, and configured to slide;

a first pulley coaxially connected to the worm wheel gear, and configured to rotate together with the worm wheel gear; and a second pulley spaced from the first pulley and configured to rotate with the first pulley by interlocking with the first pulley, wherein the first door arm is coaxially connected to the first pulley, and configured to rotate together with the worm wheel gear, wherein the second door arm is continuously disposed in parallel to the first door arm, engaged to an external circumference of the second pulley, and configured to linearly move according to a rotation of the second pulley, wherein the first pulley and the second pulley are connected by a cable, wherein the cable is provided to surround an external circumference of the first pulley and the external circumference of the second pulley, and configured to move according to rotation of the first pulley to rotate the second pulley, and wherein the first pulley, the second pulley, the first door arm, and the second door arm are accommodated in a door arm case.

2. The door opening and closing apparatus of claim 1, wherein the second door arm is telescopically movable from the first door arm.

3. The door opening and closing apparatus of claim 1, wherein the worm wheel gear, the first pulley, and an end portion of the first door arm are coaxially connected to a gear bracket provided in the vehicle body.

4. The door opening and closing apparatus of claim 3, wherein the worm wheel gear, the first pulley, and the end portion of the first door arm are hinge-rotatably connected to the gear bracket by a bracket pin.

5. The door opening and closing apparatus of claim 3, wherein the gear bracket is provided to surround upper and lower portions of the door arm case.

6. The door opening and closing apparatus of claim 1, wherein a first end portion of the second door arm is rotatably connected to a door bracket provided in the door, and wherein a second end portion of the second door arm is provided in an interior of the door arm case and configured to linearly move in a longitudinal direction of the door arm case.

7. The door opening and closing apparatus of claim 6, wherein the first end portion of the second door arm is hinge-rotatably connected to the door bracket by a door pin.

8. The door opening and closing apparatus of claim 1, wherein the worm wheel gear, the first door arm, and the second door arm are a first set and a second worm wheel gear, a third door arm, and a fourth door arm are a second set, wherein the first set and second set are disposed apart from and in parallel to each other in a longitudinal direction of the spindle.

9. The door opening and closing apparatus of claim 1, wherein the spindle is connected to a center shaft of an actuator provided in the vehicle body, and configured to rotate according to driving of the actuator.

10. The door opening and closing apparatus of claim 9, wherein the actuator is a motor.

11. The door opening and closing apparatus of claim 1, wherein the door includes a front door configured to linearly move and rotate toward a front of the vehicle body and a rear door configured to linearly move and rotate toward a rear of the vehicle body, and wherein the front door and the rear door are provided with the spindle, and the worm wheel gear, the first door arm, and the second door arm respectively.

* * * * *